Figure 1:
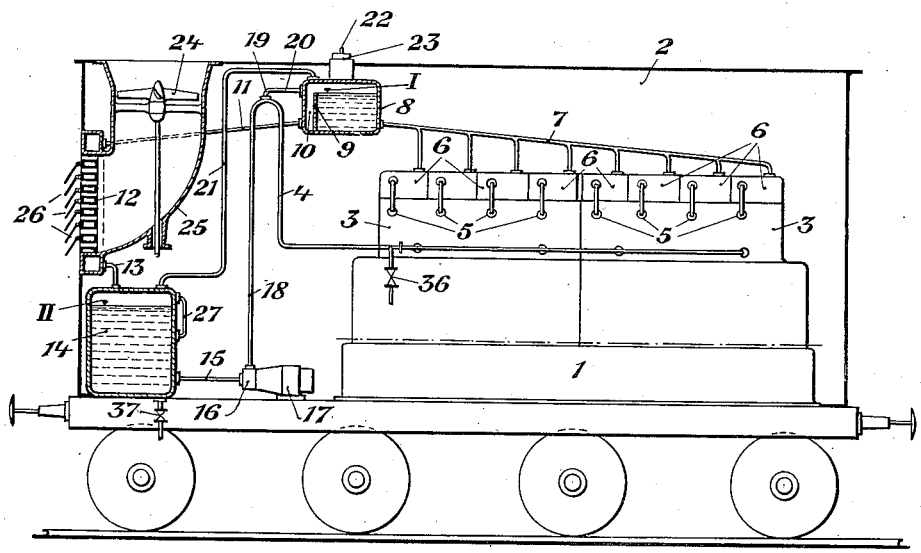

March 3, 1936.    O. SIMMEN    2,032,670
COOLING SYSTEM FOR INTERNAL COMBUSTION ENGINES
Filed July 9, 1932

INVENTOR:
Oscar Simmen
BY
Pennie Davis Marvin + Edmonds
ATTORNEY.

Patented Mar. 3, 1936

2,032,670

UNITED STATES PATENT OFFICE 2,032,670

COOLING SYSTEM FOR INTERNAL COMBUSTION ENGINES

Oscar Simmen, Erlach, Switzerland, assignor to firm Sulzer Frères Societe Anonyme, Winterthur, Switzerland Application July 9, 1932, Serial No. 621,564
In Switzerland September 8, 1931

8 Claims. (Cl. 123—170)

This invention relates to cooling liquid circulating systems for internal combustion engines and is particularly though not exclusively applicable to internal combustion engines used on vehicles for propulsion or other purposes.

In circulating systems of this type as hitherto proposed the recooler through which the medium passes is usually arranged in the roof of the vehicle so that when circulation ceases or is cut off the radiator is automatically drained. With such arrangements however it is not always possible to arrange the recooler at such a height on the roof of the vehicle that when the recooler has been drained the liquid level in the system lies above the level of the cooling jackets of the internal combustion engine. When on the other hand the arrangement is such that after draining the recooler the liquid level is below the cylinder jackets, the liquid is drained also from the latter with consequent risk of damage, and the present invention has for its object to overcome this difficulty.

To this end in a system according to the present invention the liquid, when in circulation, passes from a low level through the cylinder jackets to a high level above the jackets and thence back to the low level, and means are provided for preventing flow of liquid to the low level from the part of the system including the cylinder jackets when the circulation of liquid ceases or is interrupted so that the part of the system including the cylinder jackets remains at the said high level whilst the liquid in the remainder of the system can be drained from the high to the low level.

Conveniently the system comprises a recooler, a low level supply tank or reservoir for cooling liquid arranged below and communicating with the radiator, a feed pipe through which liquid passes from the supply tank to the cylinder jackets and thence through a high level above the cylinder jackets from which it returns under the action of gravity through the recooler to the reservoir, and means whereby when the supply of liquid to the jackets ceases the flow of liquid is interrupted at the said high level and flow of liquid from the high level through the cylinder jackets to the low level is prevented whilst flow from the part of the system including the recooler to the low level tank or reservoir is permitted. Preferably the return flow of liquid from the high level through the cylinder jackets to the low level is prevented by arranging a part of the feed pipe at or above the said high level.

The liquid when in circulation may pass from the cylinder jackets to a tank or chamber having an overflow or discharge arranged at the high level whence the liquid passes by gravity back to the low level. Alternatively a valve, automatically controlled in accordance with the pressure of the liquid in the cylinder jackets, is provided for cutting off communication between a part of the system in which liquid is maintained at the high level and a part from which it can drain to the low level.

In the accompanying drawing—

Figure 2:
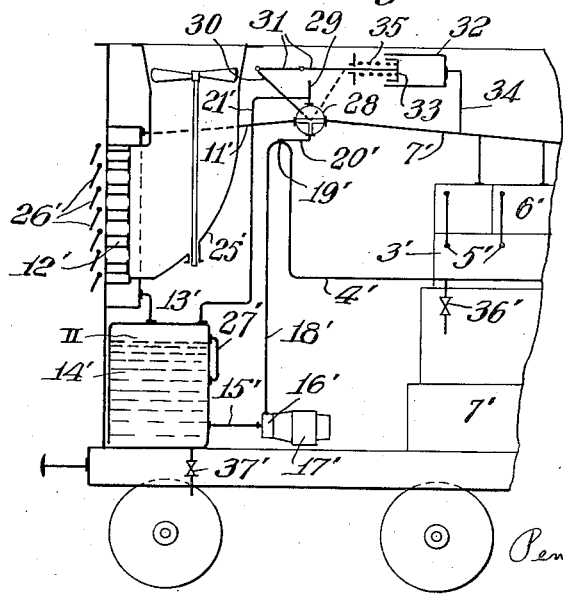

Figure 1 illustrates diagrammatically and by way of example one arrangement of circulating system according to the invention and as applied to a vehicle driven by an internal combustion engine, and Figure 2 shows a modified arrangement of part of the system shown in Figure 1.

In the arrangement illustrated in Figure 1 the internal combustion engine 1 which drives the vehicle 2 has cooling jackets 3 supplied with cooling water from a feed pipe 4. The cooling water passes from the cooling jackets 3 through pipes 5 to the cylinder head jackets 6 whence the water passes through a manifold 7 to a high level tank 8. The tank 8 is provided with an overflow or discharge aperture 9 arranged at a level above that of the jackets 3, 6. The water when in circulation passes from the overflow 9 to a chamber 10 which communicates through a pipe 11 with a recooler 12, the outlet pipe 13 of which communicates with a low level reservoir or supply tank 14. The cooling water is drawn from the reservoir 14 through a pipe 15 by a pump 16 driven by an electric motor 17, the water being delivered by the pump through a pipe 18 to the feed pipe 4.

As clearly shown in Figure 1 the junction 19 between the pipe 18 and feed pipe 4 is arranged at a level above the overflow 9, a vent pipe 20 serving as a communication between the point 19 and the air space above the level, indicated at I, of the water in the tank 8. Similarly, the air space in the top of the low level reservoir 14 communicates through a vent pipe 21 with the air space above the liquid in the tank 8. The tank 8 is provided with an air inlet valve 22 and a filler opening 23 through which water can be introduced to the system. The recooler 12 is furnished with a cooling fan 24 which is rotated within a conduit 25 by means not shown in the drawing, shutters or blades 26 being adjustable for the purpose of regulating the draught through the radiator.

When the system is in operation the pump 16 draws cooling water from the reservoir 14 through the pipe 15 and delivers it through the pipe 18 to the feed pipe 4 and thence to the cooling jackets 3, 6 from which the heated water passes through the manifold 7 to the high level tank 8. Water from the tank 8 passes through the overflow 9 into the chamber 10 from which it passes under the action of gravity through the pipe 11 to the radiator 12 where the water is cooled. The cooled water then returns to the low level reservoir 14 through the pipe 13.

When the circulation of the liquid ceases due, for example, to the pump 16 being stopped the surface of the water in the tank 8 will sink to the level of the overflow 9 after which no further water will pass from the tank 8 to the pipe 11. Thus, the water will be automatically drained from the pipe 11 and recooler 12 to the low level reservoir 14. The water contained in the tank 8, jackets 3 and 6 and the feed pipe 4 will however be maintained at the level of the overflow 9, the water in the pipe 18 dropping to the level II of the low level reservoir 14. Since the uppermost point of the pipe 18 communicates through the pipe 20 with the air space in the chamber 8 the water column in the pipe 18 and feed pipe 4 will break off at the junction 19 so that any tendency for the water in the feed pipe 4 and jackets 3, 6 to be syphoned out by the column of water in the pipe 18 is prevented.

It will therefore be seen that when the system is not in operation two liquid levels are maintained, that is to say a high liquid level in the tank 8 which ensures that the jackets 3, 6 remain filled with water, and a low liquid level II in the reservoir 14 which allows the remainder of the system to be automatically drained. When operation of the system is resumed, the water will again pass from the tank 8 through the overflow 9 to the recooler and effective circulation will take place.

The diameter of the pipes through which water is circulated is greater than that of the air pipe 20, so that when the pump 16 is in operation only a small quantity of water will pass through the pipe 20 to the chamber 10. In this respect, throttling means may if desired be provided, for example at the junction 19 further to reduce or to prevent passage of water through the pipe 20.

In the construction illustrated only one filling opening 23 is provided, this opening being so arranged that when the system is being filled with water only one liquid level, as indicated at I has to be obtained in order to ensure that the water jackets of the engine are satisfactorily filled. Thus, when filling the system with water through the opening 23 that part of the system including the jackets 3, 6 is first filled with water whereupon the addition of further water will cause the water to flow through the overflow 9 into the remaining part of the circuit, the whole system being filled and ready for working when the liquid level II in the reservoir 14 is reached. This low liquid level can be observed on the gauge 21.

Drain cocks 36, 37 are provided respectively on the feed pipe 4 and the low level reservoir 14 whereby that part of the system including the water jackets and/or the part which drains into the reservoir 14 may be emptied. If desired the drain cocks 36, 37 may be coupled together so as to ensure that one part of the system cannot be emptied without also emptying the other.

During warmer seasons of the year when risks of freezing are negligible the whole system may, if desired, be filled to the level I indicated in the tank 8 without effective circulation of the water being impaired. In this way the quantity of the cooling water may, during hot weather, be increased so that the quantity of heat to be extracted from the water per litre/second will be reduced. In this way the extraction of heat from the engine by the cooling water is as efficient as during cold weather whilst at the same time evaporation, which is greater during warm weather, is compensated for.

Figure 2 illustrates a modified arrangement of that part of the system adjacent to the high level. According to this modification a three-way rotary valve 28 is arranged at the high level between the manifold 7' and the pipe 11' which communicates with the recooler 12'. The valve 28 is operatively connected through a lever 30 and rod 31 to a piston 33 adapted to reciprocate within a cylinder 32 which communicates through a pipe 34 with the manifold 7'. A spring 35 tends to force the piston 33 into the cylinder 32. When the system is set in operation and the pressure of the water in the manifold 7' rises the piston 33 is driven outwards against the action of the spring 35 whereby the valve 28 is moved until water can flow from the manifold 7' through the valve to the pipe 11 and thence to the recooler 12'. When, however, the supply of water ceases the pressure in the manifold 7' drops and the spring 35 reasserts itself thereby moving the piston 33 into the cylinder 32 so as to turn the valve 28 and interrupt the flow of water from the manifold 7' to the pipe 11'. The lever 30 is then in the position shown dotted in Figure 2, the valve 28 establishing communication between the pipes 11', 20' and a vent pipe 29 to which the vent pipe 21' of the reservoir 14' is connected. Thus, air can enter the pipes 11' and 18' so as to permit the water to drain from the pipe 11' and recooler 12' whilst the water in the pipe 18' can sink to the level II without syphoning that in the feed pipe 4' and in the jackets. The water in the manifold 7', jackets 3', 6' and feed pipe 4' is however maintained at the level of the valve 28 since this is arranged at the same level as the junction 19' between the pipe 18' and feed pipe 4'.

When a reciprocating feed pump is employed a large clearance may be provided between the inner end of the piston 33 and the cylinder 32 when the piston is at the innermost end of its stroke whereby the cylinder will act as an air vessel to damp oscillations which the pump may tend to produce within the system.

It will therefore be seen that in a circulating system according to the present invention the possibility of the water jackets of the engine being unintentionally drained is obviated, whilst, in addition, emptying of the recooler and other parts which are liable to be damaged, for example, by frost if left filled with liquid when the system is stationary, is ensured.

It will be understood that details of construction and arrangement may be varied without departing from the invention. Thus, circulation of the liquid may be effected in any desired manner, as for example by a centrifugal, rotary or reciprocating pump and the pump or that part of the system between the low level and the engine jackets may be furnished with means which will positively prevent the cooling liquid from flowing back from the cylinder jackets to the source of supply. In the latter case the pipe or conduit communicating between the low level and the engine jackets may pass directly to the water jackets, that is to say without part of this pipe being arranged at or above the high level. When the feed pump employed is self-priming it may be arranged as desired but when the pump is not self-priming it should be arranged below the low level described. Several recoolers may be provided in the system each supplied with liquid from a high level above the level of the water jackets, the high level being either the same for all the recoolers or different for one or more of the recoolers. The power from the internal combustion engine may be transmitted to the vehicle through electrical, mechanical or hydraulic transmission mechanism and if desired the engine may be employed for purposes other than driving the vehicle. In this respect it will be understood that whilst the invention has been described as applied to a vehicle driven by an internal combustion engine, the invention is also applicable to stationary water-cooled engines of the internal combustion engine type.

I claim:

1. In a closed-circuit liquid cooling system for an internal combustion engine provided with a cooling jacket, which system is adapted to be operated while only partially filled with a cooling liquid, a re-cooler, a cooling liquid passage extending from the outlet of the cooling jacket to said re-cooler, a second liquid passage extending from the re-cooler to the inlet of the engine jacket, a reservoir in said second passage and located at a level lower than the re-cooler, means operable when the engine is running for causing liquid continuously to flow from said reservoir through a portion of said second passage to the engine jacket and from the engine jacket to the re-cooler, means in said passages for automatically interrupting the draining of the liquid when circulation of the liquid ceases, but, at such time, permitting liquid in the re-cooler to drain into the reservoir but preventing draining of the engine jacket, the interrupting means in the passage extending from the outlet of the engine jacket to the re-cooler comprising a member operable under pressure caused by the circulation of the liquid.

2. A cooling system according to claim 1 in which the interrupting means in the passage extending from the outlet of the engine jacket to the re-cooler comprises a pressure-operated valve for closing said passage.

3. In a closed-circuit liquid cooling system for an internal combustion engine provided with a cooling jacket, which system is adapted to be operated while only partially filled with a cooling liquid, a recooler for cooling the cooling medium, the bottom of said recooler being below the top of the cooling jacket of the engine, a reservoir located at a level lower than the recooler, a conduit connecting the lower portion of the recooler with the reservoir, a conduit connecting the reservoir with the cooling jacket of the engine, a passage for cooling medium to be recooled in the recooler connecting the cooling jacket of the engine and the recooler, means for circulating the cooling medium in said circuit when the engine is running, means interposed in said passage between the cooling jacket of the engine and the recooler and at a level above the top of the cooling jacket of the engine, and above the cooling surfaces of the recooler, for preventing draining of the engine jacket, but permitting draining of that portion of the passage between it and the recooler and of the recooler into said reservoir when circulation in said system ceases.

4. In a closed-circulation liquid cooling system for an internal combustion engine provided with a cooling jacket, which system is adapted to be operated while only partially filled with a cooling liquid, a recooler for cooling the cooling medium, the bottom of said recooler being below the top of the cooling jacket of the engine, a high-level liquid container, means for maintaining a liquid level in said container at least as high as the top of the cooling jacket of the engine, a cooling-liquid passage extending from the outlet of the cooling jacket to said high-level liquid container, a second liquid passage extending from the high-level liquid container to the inlet of the engine jacket, a reservoir in said second passage and located at a level lower than the high-level liquid container, at least a part of said second passage between the high-level liquid container and the reservoir acting as a recooler for the liquid, the bottom of said recooler being below the top of the cooling jacket of the engine, means operable when the engine is running for causing liquid continuously to flow from said reservoir through a portion of said second passage to the engine jacket and from the engine jacket to the recooler, means including said high-level liquid container for automatically interrupting the draining of the liquid in the engine jacket when circulation of the liquid ceases, but at such time permitting draining of that portion of the second passage leading from the high-level liquid container to the reservoir and the recooler into the reservoir.

5. A cooling system according to claim 4 in which the high-level liquid container has an overflow for passing liquid from said container to the recooler.

6. A cooling system according to claim 4 in which a portion of the passage between the reservoir and the engine jacket is elevated to a height above the level of the engine jacket, and said elevated part is vented, to automatically prevent draining of the engine jacket into the reservoir when circulation of the cooling liquid ceases.

7. A cooling system according to claim 4 in which the means for automatically interrupting the draining of the liquid when circulation ceases includes an overflow device in the high-level liquid container and in which a portion of the passage between the reservoir and the engine jacket is elevated to a height above the level of the engine jacket.

8. A cooling system according to claim 4 in which a conduit connects the reservoir and the high level liquid container when circulation of the liquid ceases, whereby, at such times, the air pressure in the reservoir and the high level liquid container are substantially equal.

OSCAR SIMMEN.